(12) United States Patent
Graham et al.

(10) Patent No.: US 10,349,120 B2
(45) Date of Patent: Jul. 9, 2019

(54) TRANSFERRING PLAYBACK QUEUES BETWEEN DEVICES

(71) Applicant: Apple Inc., Cupertino, CA (US)

(72) Inventors: David C. Graham, Cupertino, CA (US); Taylor G. Carrigan, San Francisco, CA (US); Nicholas J. Paulson, San Francisco, CA (US); Johannes P. Schmidt, Los Altos Hill, CA (US); Thomas Alsina, Saratoga, CA (US); Bob Bradley, San Jose, CA (US); Haishan Ye, Sunnyvale, CA (US); James C. Grandy, Reedwood City, CA (US); Pierre De Lastic, Belmont, CA (US); Julien Lerouge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/970,610

(22) Filed: May 3, 2018

(65) Prior Publication Data

US 2018/0338177 A1    Nov. 22, 2018

Related U.S. Application Data

(60) Provisional application No. 62/507,100, filed on May 16, 2017.

(51) Int. Cl.
*H04N 7/16* (2011.01)
*H04N 21/4363* (2011.01)
(Continued)

(52) U.S. Cl.
CPC ... *H04N 21/43637* (2013.01); *H04N 21/4126* (2013.01); *H04N 21/41407* (2013.01);
(Continued)

(58) Field of Classification Search
CPC ....... H04N 21/43637; H04N 21/41407; H04N 21/47217; H04N 21/4825
(Continued)

(56) References Cited

U.S. PATENT DOCUMENTS

2014/0006947 A1    1/2014 Garmark et al.
2014/0181654 A1    6/2014 Kumar et al.
(Continued)

FOREIGN PATENT DOCUMENTS

WO    2013/028884 A2    2/2013
WO    2015/127463 A1    8/2015

*Primary Examiner* — Jivka A Rabovianski
(74) *Attorney, Agent, or Firm* — Invoke

(57) ABSTRACT

In some implementations, a computing device can transfer a playback queue between the computing device and a playback device. For example, the computing device can detect when the computing device is within a threshold distance of a playback device. The computing device can establish a connection to the playback device and receive state information describing the media playback state of the playback device. The computing device can determine the media playback state of the computing device. The computing device can present graphical user interfaces for initiating a transfer of a playback queue between the computing device and the playback device based on the playback state of the devices. The computing device can initiate a transfer of the playback queue in response to user input to one of the graphical user interfaces or automatically based on the context of the computing device.

21 Claims, 12 Drawing Sheets

(51) Int. Cl.
  *H04N 21/41*   (2011.01)
  *H04N 21/472*  (2011.01)
  *H04N 21/414*  (2011.01)
  *H04N 21/482*  (2011.01)

(52) U.S. Cl.
  CPC ..... *H04N 21/472* (2013.01); *H04N 21/47217* (2013.01); *H04N 21/4825* (2013.01)

(58) Field of Classification Search
  USPC .................................................. 725/87, 139
  See application file for complete search history.

(56) References Cited

U.S. PATENT DOCUMENTS

| | | |
|---|---|---|
| 2014/0181655 A1 | 6/2014 | Kumar et al. |
| 2015/0319288 A1* | 11/2015 | Kahn ................... H04W 4/21 455/41.2 |
| 2016/0149891 A1 | 5/2016 | Kuper et al. |
| 2016/0191574 A1 | 6/2016 | Garmark et al. |
| 2016/0210113 A1 | 7/2016 | Kumar et al. |
| 2016/0246567 A1 | 8/2016 | Fullerton et al. |
| 2016/0357862 A1 | 12/2016 | Coburn, IV |

* cited by examiner

TRANSFERRING PLAYBACK QUEUES BETWEEN DEVICES

TECHNICAL FIELD

The disclosure generally relates to managing media playback queues across computing devices.

BACKGROUND

Many people use their computing device to play and manage media items. For example, a user of a computing device may buy media items (e.g., music, movies, television shows, etc.) and store the media items on the computing device. Often a user will stream a media item from the computing device to a playback device, such as a networked speaker, Bluetooth speaker, set-top-box, smart television, etc. However, to continue playing the media item on the playback device, the computing device must be within range of the playback device so that the computing device can continue streaming (e.g., transmitting) the media item to the playback device.

SUMMARY

In some implementations, a computing device can transfer a playback queue between the computing device and a playback device. For example, the computing device can detect when the computing device is within a threshold distance of a playback device. The computing device can establish a connection to the playback device and receive state information describing the media playback state of the playback device. The computing device can determine the media playback state of the computing device. The computing device can present graphical user interfaces for initiating a transfer of a playback queue between the computing device and the playback device based on the playback state of the devices. The computing device can initiate a transfer of the playback queue in response to user input to one of the graphical user interfaces or automatically based on the context of the computing device.

In some implementations, a computing system can be configured so that a first user device can delegate a first user's media account credentials to second user device corresponding to a second user. For example, a playback device may be configured with the second user's media account credentials for accessing media items through a network media service. A first user may wish to play media items associated with the first user's media account credentials on the playback device. To do so, the first user device can request a device identifier for the playback device, request and obtain a delegate token for the device identifier from the media service, and provide the delegate token along with media item information to the playback device. The playback device can then use the delegate token to request the media item and/or media item keys associated with the first user's media access account.

Particular implementations provide at least the following advantages. A computing device that has sent a media item to a playback device for playback can be disconnected from a playback device without terminating playback of the media item at the playback device. Intuitive graphical user interfaces for sending and/or receiving media queues are presented automatically and in an intelligent manner based on device playback state and/or proximity. By allowing a guest user to delegate credentials, a guest user can send media items to a playback device without worrying about whether the owner of the playback device has access to the same media item.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
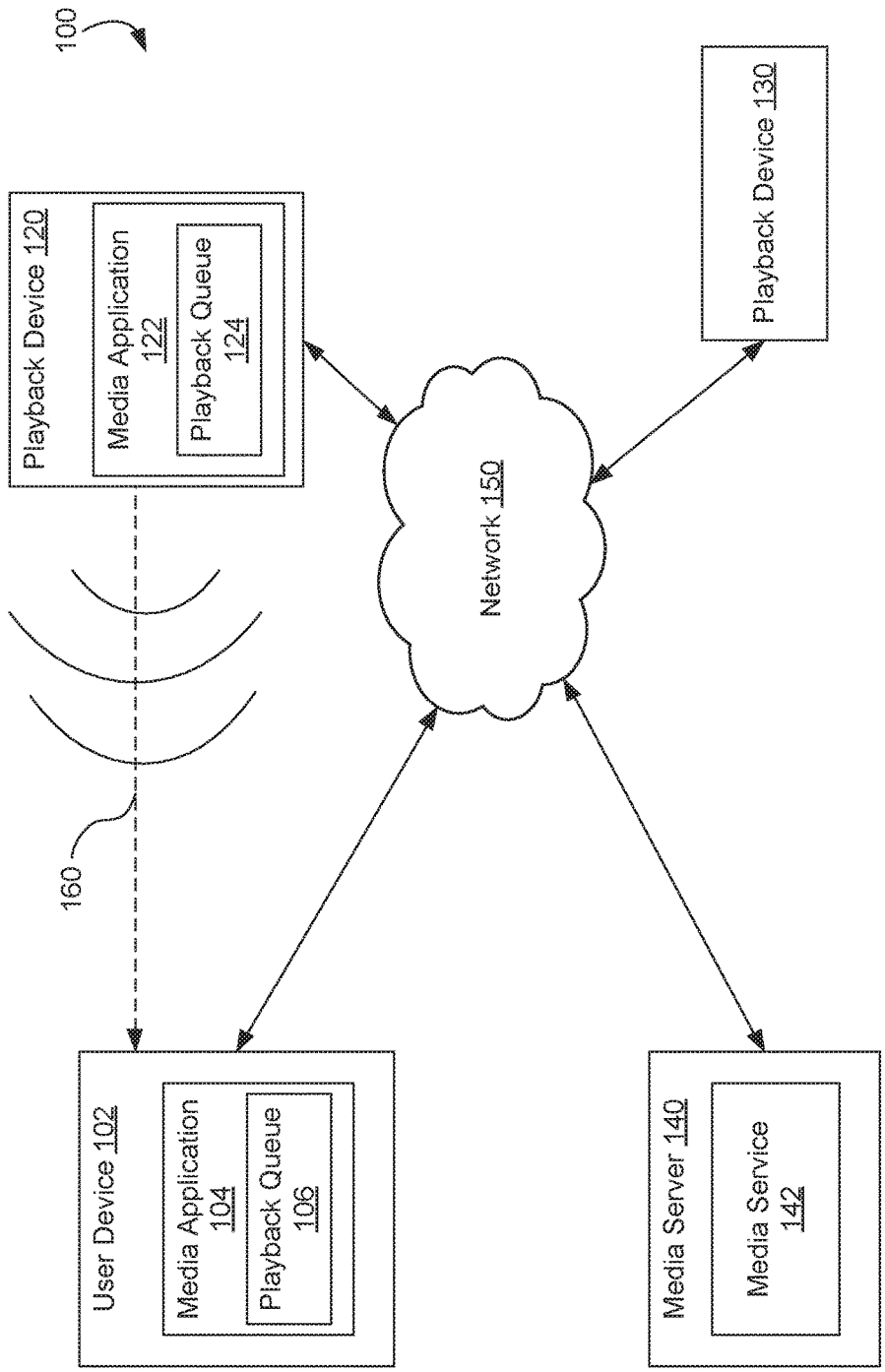
FIG. 1 is a block diagram of an example system for transferring playback queues between devices and credential delegation.

FIG. 1 is a block diagram of an example system 100 for transferring playback queues between devices and credential delegation. For example, system 100 can be configured to transmit playback queues between a user device and a playback device so that the receiving device can manage playback of media items identified in the playback queue. System 100 can be configured to delegate the media account credentials associated with a first user's device to a second user's device so that the second user's device can play back media items associated with the first user's media account.

In some implementations, system 100 can include user device 102. For example, user device 102 can be a computing device, such as a smartphone, laptop computer, tablet computer, smart watch, or any other computing device.

In some implementations, user device 102 can include media application 104. For example, media application 104 can be used by the user of user device 102 to manage media items (e.g., music tracks, playlists, albums, movies, television shows, radio talk shows, audio books, podcasts, etc.) on user device 102.

In some implementations, media application 104 can be a client application of a network media service. For example, media application 104 can be configured with a user's media service account credentials for accessing the media service 142 on media server device 140. The user credentials can include, for example, an account identifier (e.g., user name, phone number, device identifier, account token, etc.) and a shared secret (e.g., password, encryption key, secret token, fingerprint data, etc.). Media service 142 can provide cloud storage for the user's media items. Media service 142 can provide on demand access to media items, Internet radio, and/or other types of media. A user can interact with various graphical user interfaces of media application 104 to access media items through network 150 (e.g., a local area network, wide area network, Wi-Fi network, cellular network, the Internet, etc.). For example, the user can generate a playlist of media items. The playlist may reference media items provided by media service 142. When the user wishes to play back the playlist, media application 104 can load the playlist into an in-memory playback queue 106. Then media application 104 can play the media items in playback queue 106 using the display and/or speakers of user device 102.

In some implementations, user device 102 can stream a media item to a playback device. For example, while playing a media item in playback queue 106, media application 104 can send the audio and/or video associated with the playing media item to playback device 130. For example, playback device 130 can be a Wi-Fi speaker, a Bluetooth speaker, a streaming media device (e.g., set-top-box), a smart television, or any other device capable of receiving and/or presenting audio and/or video data sent by user device 102. In this instance, media application 104 is playing back the media item (e.g. received from media service 142), the playback queue being played (e.g., playback queue 106) is still on user device 102, and media application 104 is sending audio and/or video data to playback device 130 for presentation through the speakers and/or display of playback device 130. If user device 102 is moved out of range of playback device 130 (e.g., user device 102 loses the connection to playback device 130), then playback device 120 will no longer receive the audio and/or video data and playback device 130 will stop playing the audio and/or video associated with the media items in playback queue 106.

In some implementations, system 100 can include smart playback device 120. For example, playback device 120 can be a Wi-Fi speaker, a Bluetooth speaker, an in-car entertainment system, a streaming media device (e.g., set-top-box), a smart television, or any other device capable of receiving, managing, and playing a playback queue. Like user device 102, playback device 120 can be configured with media application 122. Media application 122 can have the same, or similar, capabilities and/or features as media application 104. For example, media application 122 can include playback queue 124 that includes information about media items currently being played by media application 122. In some instances, playback queue 124 may identify media items provided by media service 142 on media server 140. Playback device 120 can be configured with a user's media account credentials for accessing media service 142 so that media application 122 can obtain media items identified in playback queue 124 from media service 142 through network 150.

In some implementations, user device 102 can send playback queue 106 to playback device 120. For example, user device 102 can receive a wireless signal 160 (e.g., Bluetooth, Wi-Fi, etc.) broadcast from playback device 120. For example, playback device 120 can periodically broadcast a wireless signal so that other devices, such as user device 102, can find and connect to playback device 120. User device 102 can determine, based on the signal, that user device 102 is within a threshold distance of (e.g., proximate to) playback device 120. In some implementations, in response to determining that user device 102 is proximate to playback device 120, user device 102 can present a graphical user interface that a user can interact with to initiate a transfer of playback queue 102 and/or playback queue 124 between user device 102 and playback device 120, as described in detail below. In some implementations, in response to determining that user device 102 is proximate to playback device 120 and that user device 102 is in a resting position (e.g., on a table, horizontal, not moving, etc.), user device 102 can automatically initiate a transfer of playback queue 106 to playback device 120, as described in detail below.

In some implementations, other criteria (e.g., other than resting position) can trigger the automatic transfer of a playback queue. For example, user device 102 can automatically transfer a playback queue playing on user device 102 to playback device 120 in response to detecting that user device 102 is proximate to a particular playback device. The user can configure user device 102 to automatically transfer playback of the playback queue playing on user device 102 to the particular playback device 120 when user device 102 receives the device identifier corresponding to the particular playback device in a broadcast signal and/or when user device 102 is proximate to playback device 120, as described above. For example, the user can configure user device 102 to automatically transfer playback of a playback queue to playback device 120 when user device 102 is proximate to the user's in-car entertainment system or the user's favorite Bluetooth speaker.

Similarly, user device 102 can automatically transfer a playback queue playing on user device 102 to playback device 120 in response to detecting that user device 102 is proximate to a particular type of playback device. The user can configure user device 102 to automatically transfer playback of the playback queue to a type of playback device 120 when user device 102 receives a device type identifier corresponding to the particular type of playback device in a broadcast signal and/or when user device 102 is proximate to playback device 120, as described above. For example, the user can configure user device 102 to automatically transfer playback of a playback queue to playback device 120 when user device 102 is playing media items in the playback queue and user device 102 proximate to any in-car entertainment system.

In some implementations, user device 102 can automatically transfer a playback queue playing on user device 102 to playback device 120 in response to detecting that user device 102 is next to playback device 102. For example, user device 102 can be configured with a proximity threshold distance, as described above. User device 102 can be configured with a second threshold distance that is less than the proximity threshold distance. The second threshold distance can be used to determine when user device 102 is next to playback device 102. For example, the second threshold distance can be 6 inches. When user device 102 is playing media items in playback queue, user device 102 can automatically transfer playback of the playback queue when user device 102 determines that user device is within 6 inches of playback device 120.

Figure 2:
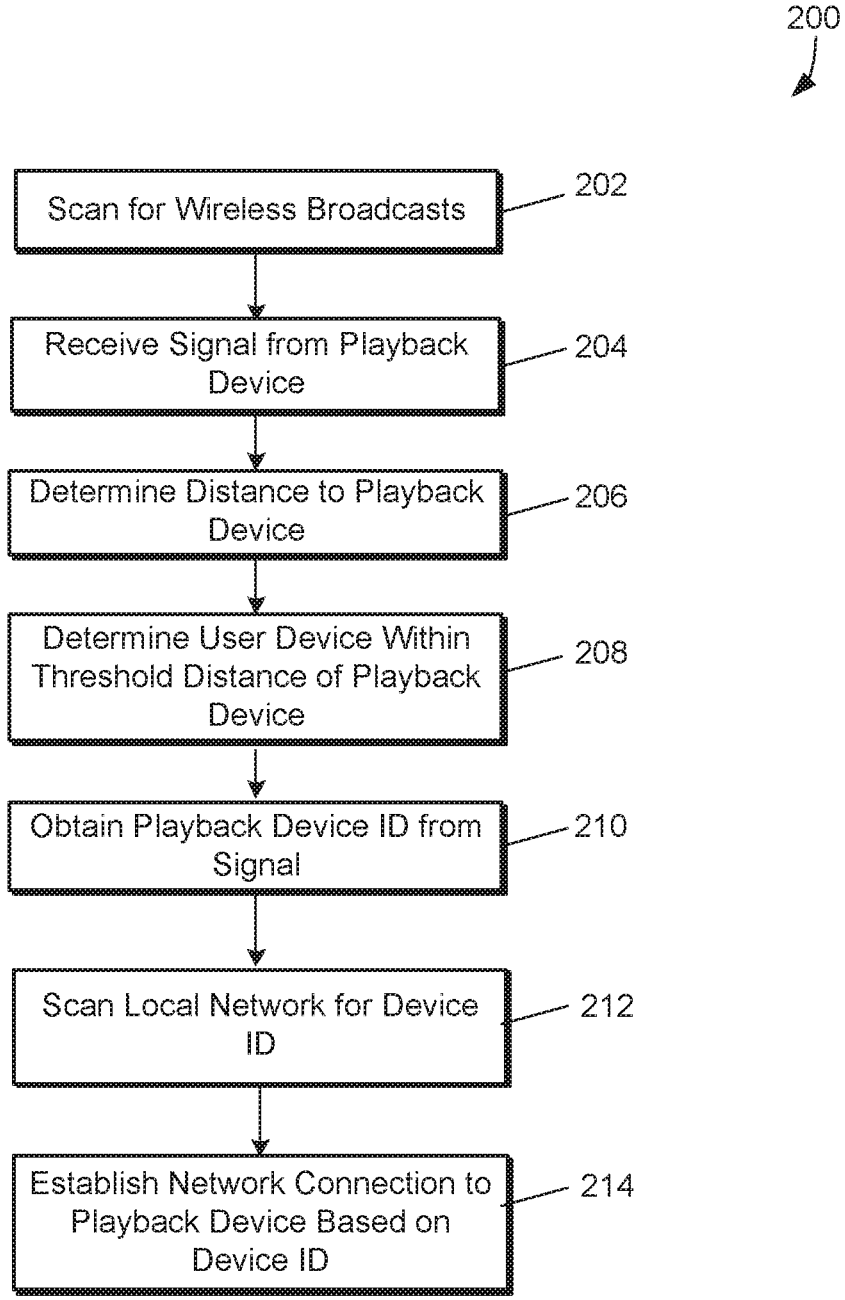
FIG. 2 is a flow diagram of an example process for establishing a connection to a playback device based on proximity.

FIG. 2 is a flow diagram of an example process 200 for establishing a connection to a playback device based on proximity. For example, user device 102 can perform the steps of process 200 to detect and connect to playback device 120.

At step 202, user device 102 can scan for wireless broadcasts. For example, user device 102 can scan for wireless signals broadcast from other devices, such as other computers, accessories, speakers, playback device 120, etc. For example, playback device 120 can broadcast the signal using Bluetooth, Bluetooth LE, peer-to-peer Wi-Fi, near field communication (NFC), ultra-wideband or other wireless broadcasting technologies. Playback device 120 can broadcast the signal as an advertisement of availability or to indicate a service that they can provide. Playback device 120 can include a device identifier for the playback device 120 in the broadcast signal. For example, the device identifier can be a Bluetooth MAC (media access control) address, a virtual MAC address, or some other identifier associated with the broadcasting device. Playback device 120 can broadcast the signal periodically (e.g., every second, every 10 seconds, etc.).

In some implementations, user device 102 can scan periodically for the wireless broadcasts. In some implementations, user device 102 can scan for the wireless broadcasts in response to some event at user device 102. For example, the event can correspond to the user providing input to user device 102, user device 102 waking from a low power state, the display of user device 102 being illuminated, user device 102 turning on one or more communication radios within user device 102, user device 102 detecting some movement of user device 102, or some other event.

At step 204, user device 102 can receive a wireless broadcast signal from playback device 120. For example, while scanning for wireless signals, user device 102 can receive a wireless signal broadcast from playback device 120. The received signal can include a device identifier for playback device 120. User device 120 can determine the received signal strength indicator for the received signal according to well-known processes. User device 120 can determine the time of flight of the signal according to well-known processes.

At step 206, user device 102 can determine the distance to playback device 120. For example, user device 102 can determine the distance between user device 102 and playback device 120 based on the determined received signal strength indicator and/or determined time of flight for the received signal, according to well-known processes.

At step 208, user device 102 can determine that user device 102 is within a threshold distance of playback device 120. For example, user device 102 can be configured with a threshold distance for determining whether user device 102 is proximate (e.g., close, nearby, etc.) another device (e.g., playback device 120). User device 102 can compare the distance determined at step 106 to the threshold distance to determine whether the determined distance is less than the threshold distance. When the threshold distance is less than the threshold distance, user device 102 can determine that user device 102 is proximate to playback device 120 and continue process 200 to establish a connection with playback device 120. When the threshold distance is greater than or equal to the threshold distance, user device 102 can determine that user device 102 is not proximate to playback device 120 terminate process 200 at step 208.

At step 210, user device 102 can obtain the device identifier for playback device 120 from the wireless signal. As described above, the wireless signal received by user device 102 can include the device identifier for the broadcasting device (e.g., playback device 120). User device 102 can obtain the device identifier for playback device 120 from the received wireless signal.

At step 212, user device 102 can scan the local network for the device identifier corresponding to playback device 120. For example, the local network can be a Wi-Fi network, local area network, etc. Devices connected to the local network can broadcast their availability on the network by sending advertising messages that include the device identifier of the broadcasting device. For example, playback device 120 can send an advertising message over the local network that includes the device identifier of playback device 120 and/or information (e.g., IP address, device name, MAC address, etc.) needed to connect to playback device 120 over the local network. The device identifier broadcast on the local network can be the same device identifier broadcast in the wireless signal described above. User device 102 can receive the local network advertisement messages and compare the device identifier in the wireless broadcast to the advertisement messages received on the local network to find the advertisement message broadcast by playback device 120. Alternatively, when an internet protocol (IP) address (e.g., device identifier) for the broadcasting playback device 120 is included in the wireless signal broadcast received at step 204, user device 102 can skip step 212 and connect to playback device 120 using the IP address from the wireless signal.

At step 214, user device 120 can establish a network connection to playback device 120 based on the device identifier. For example, user device 120 can use the information in the local network advertisement message to establish a connection over the local network to playback device 120. In some implementations, user device 102 can establish a point-to-point Wi-Fi connection (e.g., AWDL) with playback device 120 if playback device 120 is not on the same network as user device 102. In some implementations, user device 102 can use an IP address included in the wireless signal to establish a connection to playback device 120.

While process 200 describes playback device 120 as the broadcasting device and user device 102 as the scanning device for establishing the connection between playback device 120 and user device 102, the roles of playback device 120 and user device 102 in process 200 can be reversed. For example, user device 102 can broadcast a wireless signal indicating that user device 102 is available to connect to a playback device. User device 102 can, for example, broadcast the signal upon waking, upon receiving some user input, upon detecting movement, etc. Playback device 120 can periodically scan for broadcast signals and when a signal is received from user device 102, playback device 120 can determine proximity and establish a local network connection to user device 102 using the mechanisms above in process 200.

As described above, process 200 assumes that a relationship between user device 102 and playback device 120 has already been established. For example, prior to performing process 200, user device 102 and playback device 120 may need to be setup so that user device 102 is authorized to access playback device 120 without additional user input to perform authentication and/or authorization of user device 102. This relationship can be setup using well known device pairing techniques and/or as described with reference to U.S. patent application Ser. No. 13/913,172, which is incorporated herein by reference.

Figure 3:
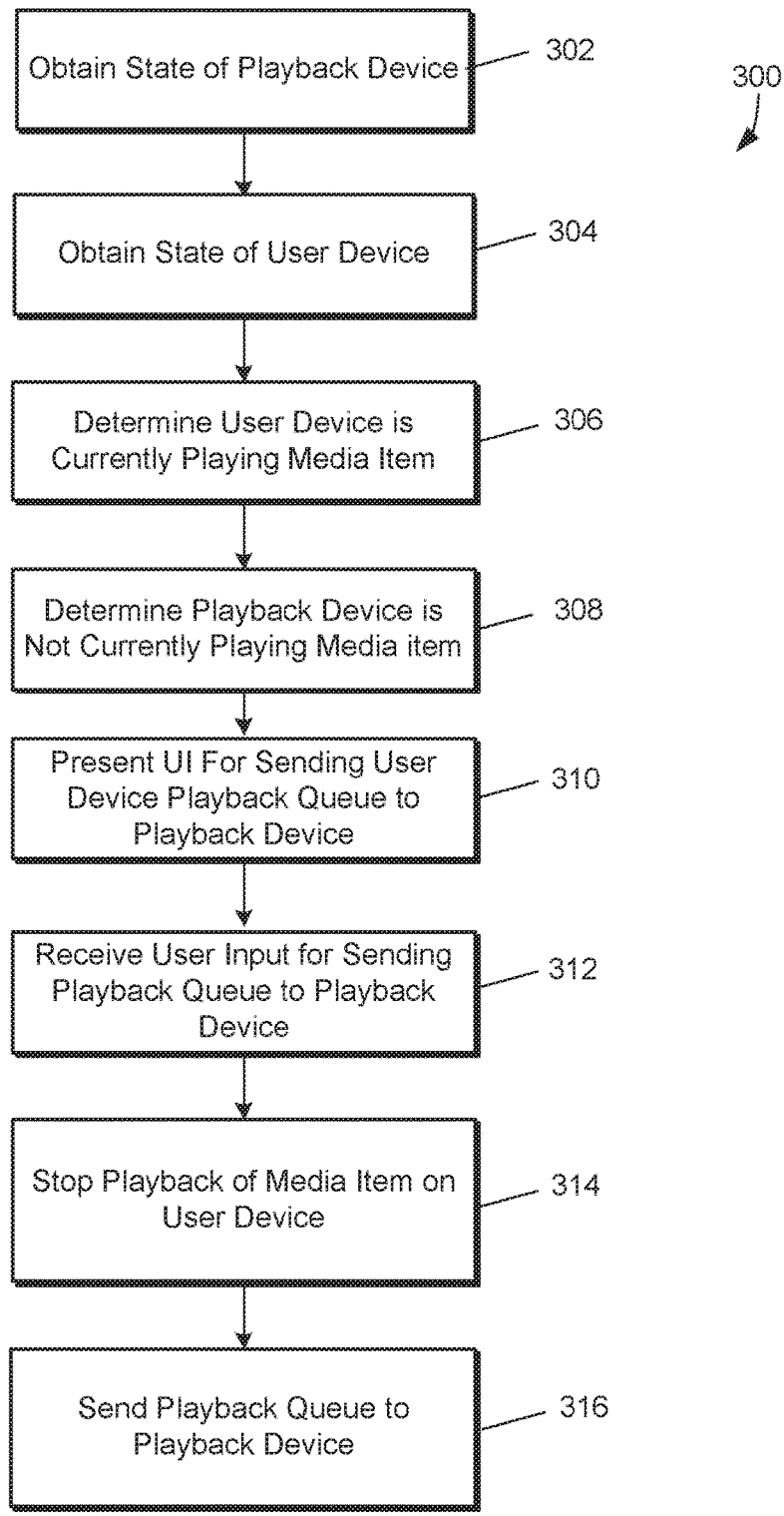
FIG. 3 is a flow diagram of an example process for sending a playback queue to a playback device.

FIG. 3 is a flow diagram of an example process 300 for sending a playback queue to a playback device. For example, process 300 can be performed by user device 102 after establishing a connection with playback device 120 according to process 200 described above.

At step 302, user device 102 can obtain the playback state of playback device 120. For example, media application 104 can send a message to media application 122 on playback device 120 requesting the playback state of media application 122. Media application 122 can send a response to media application 104 indicating that the playback state of media application 122 is that media application 122 is not playing any media items at the time of the request. Media application 122 can send a response to media application 104 indicating that the playback state of media application 122 is that media application 122 is currently playing a media item.

At step 304, user device 102 can obtain the playback state of user device 102. For example, media application 104 can obtain information indicating whether media application 104 is currently playing any media item.

At step 306, user device 102 can determine that user device 102 is currently playing a media item. For example, media application 104 can determine that media application 104 is currently playing a media item based on the state information obtained at step 304.

At step 308, user device 102 can determine that playback device 120 is not currently playing a media item. For example, media application 104 can determine that media application 122 is not currently playing a media item based on the state information obtained at step 302.

At step 310, user device 102 can present a graphical user interface for sending the playback queue of user device 102 to playback device 120. For example, based on the determination that media application 104 on user device 102 is currently playing a media item and that media application 122 on playback device 120 is not currently playing a media item, user device 102 can present a graphical user interface (e.g., graphical user interface 400 of FIG. 4) that a user can manipulate to cause media application 104 to transfer playback of playback queue 106 to playback device 120. In this case, transferring playback queue 106 to playback device 120 will cause media application 122 on playback device 120 take over playback of playback queue 106 from media application 104.

Figure 4:
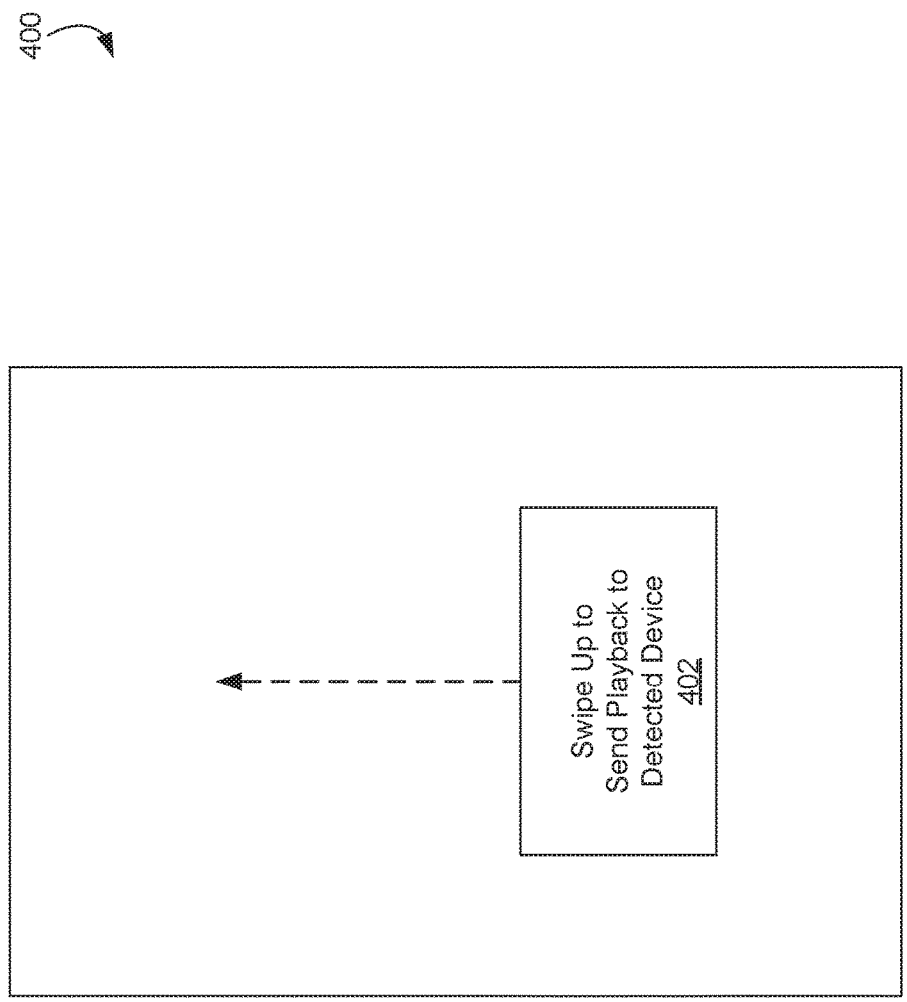
FIG. 4 illustrates an example graphical user interface for transferring playback of a playback queue from a user device to a playback device.

FIG. 4 illustrates an example graphical user interface 400 for transferring playback of playback queue 106 from user device 102 to playback device 120. For example, graphical user interface (GUI) 400 can be presented when user device 120 determines that media application 104 on user device 102 is playing a media item and media application 122 on playback device 120 is not playing a media item. In some implementations, GUI 400 can be presented on a lock screen of user device 102. Thus, a user may manipulate GUI 400 when user device is locked and without unlocking user device 102 (e.g., before entering the user's credentials to unlock user device 102).

In some implementations, GUI 400 can include graphical element 402. For example, graphical element 402 can include a prompt informing the user that manipulation of graphical element 402 will cause user device 102 to send playback of playback queue 106 to the detected proximate playback device (e.g., playback device 120). The user may provide input (e.g., touch input) to move or manipulate graphical element 402 on GUI 400. For example, the user may provide input in the form of a swipe gesture (e.g., touch and drag) in an upward motion (e.g., away from the user) on the display of user device 102 to initiate the transfer of playback between devices.

Returning to FIG. 3, at step 312, user device 102 can receive user input for sending playback queue 106 to playback device 120. For example, media application 104 can receiving user input manipulating graphical element 402.

At step 314, user device 102 can stop playback of playback queue 106. For example, media application 104 can stop playback of the currently playing media item and record the location (e.g., time offset) in the media item where playback was stopped. The time offset can be stored in the corresponding media item data in playback queue 106. In some implementations, media application 104 can store an indication of which media item was playing when playback of playback queue 106 was stopped. For example, media application 104 can store the media item identifier for the stopped or interrupted media item in playback queue 106.

At step 316, user device 102 can send playback queue 106 to playback device 120. For example, media application 104 can send playback queue 106 to media application 122 on playback device 120. Playback queue 106 can include an ordered collection of media items. Each media item in the playback queue can include media item data, including a media item identifier (e.g., track identifier, movie identifier, television episode identifier, etc.), an account identifier that identifies the account of the user who enqueued the media item, and/or a delegate token (described further below). For the interrupted media item (e.g., the first media item in the queue), the media item data can include a time offset that indicates the current position of playback. When sending playback queue 106 at step 316, media application 104 can include an indication that media application 122 should take over playback of playback queue 106. When sending playback queue 106 at step 316, media application 104 can include an indication (e.g., a media item identifier) of which media item was stopped or interrupted when playback of playback queue 106 was stopped so that media application 122 can resume play back at the indicated media item. When media application 122 receives playback queue 106, media application 122 can save playback queue 106 as playback queue 124 and continue playback of playback queue 124 (e.g., playback queue 106) at the time offset indicated in the media item in playback queue 124 that media application 104 indicated should be resumed. Thus, a user can cause user device 102 to transfer playback of a playback queue currently being played by user device 102 to a nearby playback device.

Figure 5:
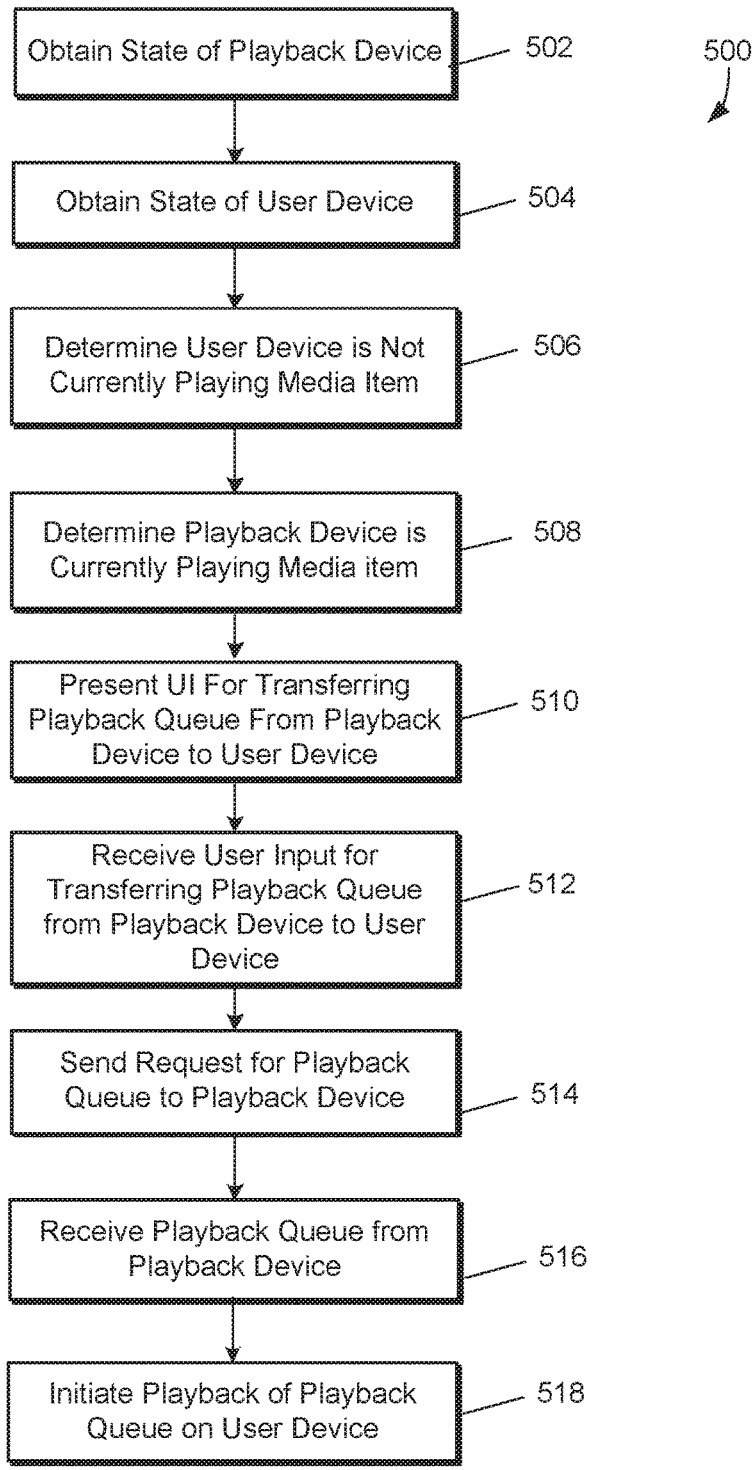
FIG. 5 is a flow diagram of an example process for retrieving a playback queue from a playback device.

FIG. 5 is a flow diagram of an example process 500 for retrieving a playback queue from a playback device. For example, process 500 can be performed by user device 102 after establishing a connection with playback device 120 according to process 200 described above.

At step 502, user device 102 can obtain the playback state of playback device 120. For example, media application 104 can send a message to media application 122 on playback device 120 requesting the playback state of media application 122. Media application 122 can send a response to media application 104 indicating that the playback state of media application 122 is that media application 122 is not playing any media items at the time of the request. Media application 122 can send a response to media application 104 indicating that the playback state of media application 122 is that media application 122 is currently playing a media item.

At step 504, user device 102 can obtain the playback state of user device 102. For example, media application 104 can obtain information indicating whether media application 104 is currently playing any media item.

At step 506, user device 102 can determine that user device 102 is not currently playing a media item. For example, media application 104 can determine that media application 104 is not currently playing a media item based on the state information obtained at step 504.

At step 508, user device 102 can determine that playback device 120 is currently playing a media item. For example, media application 104 can determine that media application 122 is currently playing a media item based on the state information obtained at step 502.

At step 510, user device 102 can present a graphical user interface for requesting the playback queue from playback device 120. For example, based on the determination that media application 104 on user device 102 is not currently playing a media item and that media application 122 on playback device 120 is currently playing a media item, user device 102 can present a graphical user interface (e.g., graphical user interface 600 of FIG. 6) that a user can manipulate to cause media application 104 to transfer playback of playback queue 124 from playback device 120 to user device 102. In this case, transferring playback queue 124 to playback device 102 will cause media application 104 on user device 102 to take over playback of playback queue 124 from media application 122.

Figure 6:
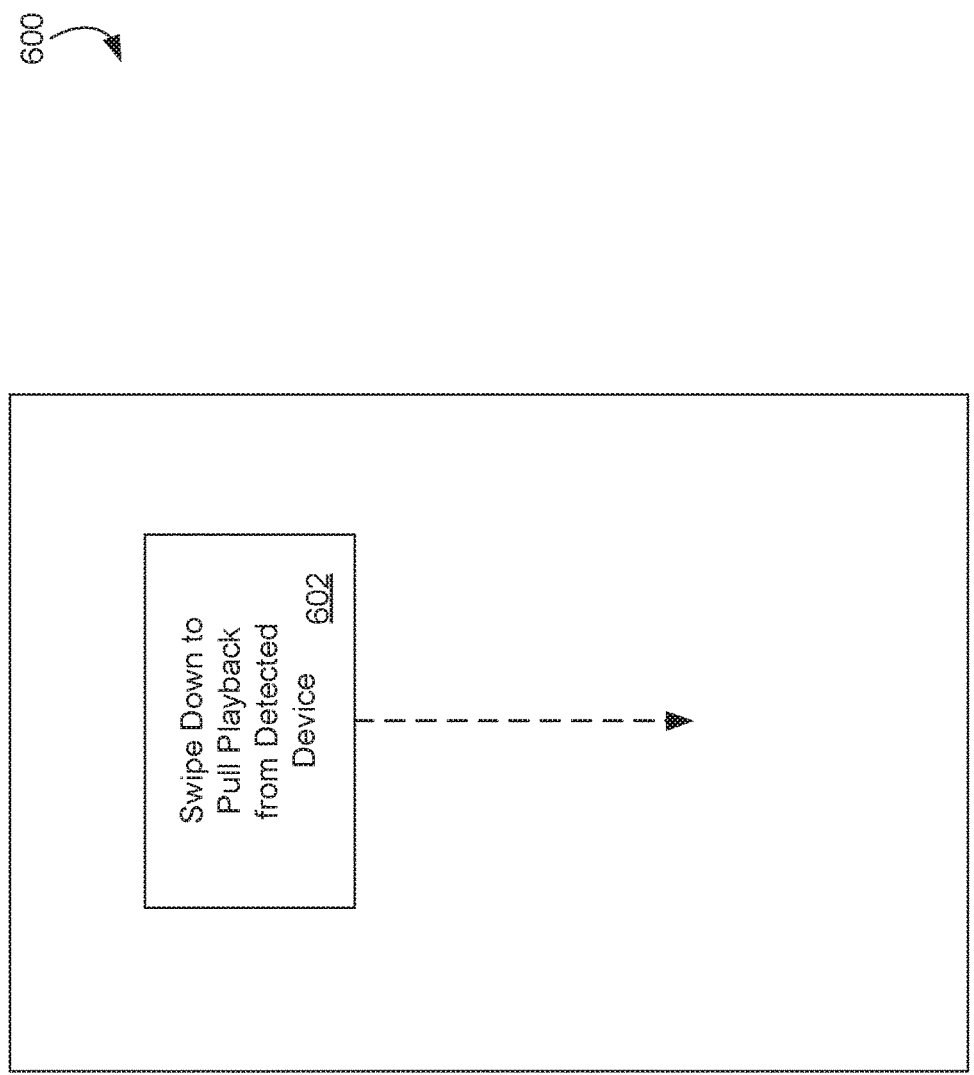
FIG. 6 illustrates an example graphical user interface for transferring playback of a playback queue from a playback device to a user device.

FIG. 6 illustrates an example graphical user interface 600 for transferring playback of playback queue 124 from playback device 120 to user device 102. For example, graphical user interface (GUI) 400 can be presented when user device 120 determines that media application 104 on user device 102 is not playing a media item and media application 122 on playback device 120 is playing a media item. In some implementations, GUI 600 can be presented on a lock screen of user device 102. Thus, a user may manipulate GUI 400 when user device is locked and without unlocking user device 102 (e.g., before entering the user's credentials to unlock user device 102).

In some implementations, GUI 600 can include graphical element 602. For example, graphical element 602 can include a prompt informing the user that manipulation of graphical element 602 will cause user device 102 to transfer playback of playback queue 124 on the detected proximate playback device (e.g., playback device 120) to user device 102. The user may provide input (e.g., touch input) to move or manipulate graphical element 602 on GUI 600. For example, the user may provide input in the form of a swipe gesture (e.g., touch and drag) in a downward motion (e.g., toward from the user) on the display of user device 102 to initiate the transfer of playback between devices.

Returning to FIG. 5, at step 512, user device 102 can receive user input for transferring playback of playback queue 124 to user device 102. For example, media application 104 can receive user input manipulating graphical element 602, described above.

At step 514, user device 102 can send a request to take over playback of playback queue 124 to playback device 120. For example, in response to receiving the user input at step 512, media application 104 can send a message to media application 122 on playback device 120 requesting that playback of playback queue 124 be transferred to media application 104 on user device 102. In response to receiving the request, media application 122 on playback device 120 can stop playback of the currently playing media item in playback queue 124 and record the location (e.g., time offset) where playback was stopped in the media item. The time offset can be stored in the corresponding media item data (e.g., in the first media item) in playback queue 124. In some implementations, media application 122 can store an indication of which media item was playing when playback of playback queue 124 was stopped. For example, media application 122 can store the media item identifier for the stopped or interrupted media item in playback queue 124.

At step 516, user device 102 can receive playback queue 124 from playback device 120. For example, media application 122 can send playback queue 124 to media application 104 on user device 102. Playback queue 124 can include an ordered collection of media items. Each media item in the playback queue can include media item data, including a media item identifier (e.g., track identifier, movie identifier, television episode identifier, etc.), an account identifier that identifies the account of the user who enqueued the media item, and/or a delegate token (described further below). For the interrupted media item (e.g., the first media item in the queue), the media item data can include a time offset that indicates the current position of playback. When sending playback queue 124 at step 516, media application 122 can include an indication that media application 104 should take over playback of playback queue 124. When sending playback queue 124 at step 516, media application 122 can include an indication (e.g., the identifier for the interrupted media item) of which media item in playback queue 124 should be played first so that media application 122 can resume play back at the indicated media item. When media application 104 receives playback queue 124, media application 104 can save playback queue 124 as playback queue 106.

At step 518, user device 102 can initiate playback of playback queue 106 on user device 102. For example, media application 104 can continue playback of playback queue 106 (e.g., playback queue 124) at the time offset indicated in the media item in playback queue 106 that media application 122 indicated should be resumed. Thus, a user can cause user device 102 to transfer playback of a playback queue currently being played by a nearby playback device to user device 102.

Figure 7:
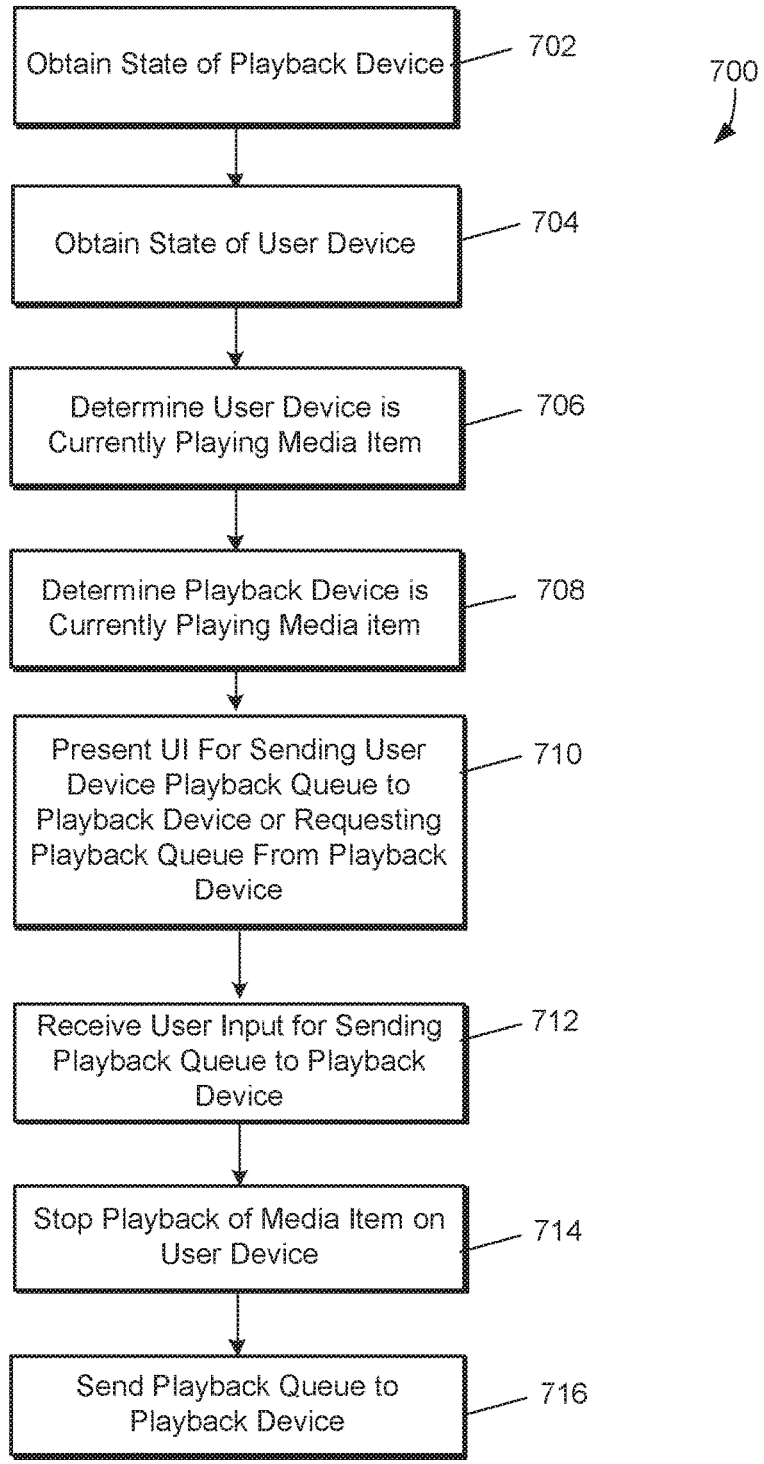
FIG. 7 is a flow diagram of an example process for sending a playback queue to a playback device when both user device and playback device are playing media items.

FIG. 7 is a flow diagram of an example process 700 for sending a playback queue to a playback device when both user device and playback device are playing media items. For example, process 700 can be performed by user device 102 after establishing a connection with playback device 120 according to process 200 described above.

At step 702, user device 102 can obtain the playback state of playback device 120. For example, media application 104 can send a message to media application 122 on playback device 120 requesting the playback state of media application 122. Media application 122 can send a response to media application 104 indicating that the playback state of media application 122 is that media application 122 is not playing any media items at the time of the request. Media application 122 can send a response to media application 104 indicating that the playback state of media application 122 is that media application 122 is currently playing a media item.

At step 704, user device 102 can obtain the playback state of user device 102. For example, media application 104 can obtain information indicating whether media application 104 is currently playing any media item.

At step 706, user device 102 can determine that user device 102 is currently playing a media item. For example, media application 104 can determine that media application 104 is currently playing a media item based on the state information obtained at step 304.

At step 708, user device 102 can determine that playback device 120 is currently playing a media item. For example, media application 104 can determine that media application 122 is currently playing a media item based on the state information obtained at step 302.

At step 710, user device 102 can present a graphical user interface for sending the playback queue of user device 102 to playback device 120 or requesting the playback queue of playback device 120. For example, based on the determination that media application 104 on user device 102 is currently playing a media item and that media application 122 on playback device 120 is also currently playing a media item, user device 102 can present a graphical user interface (e.g., graphical user interface 900 of FIG. 9) that a user can manipulate to cause media application 104 to transfer playback of playback queue 106 to playback device 120 or transfer playback of playback queue 124 to user device 102. In this case, transferring playback queue 106 to playback device 120 will cause media application 122 on playback device 120 take over playback of playback queue 106 from media application 104, as described above with reference to process 300 of FIG. 3. Similarly, transferring playback queue 124 to user device 102 will cause media application 104 on user device 102 take over playback of playback queue 124 from media application 122, as described above with reference to process 500 of FIG. 5.

Figure 9:
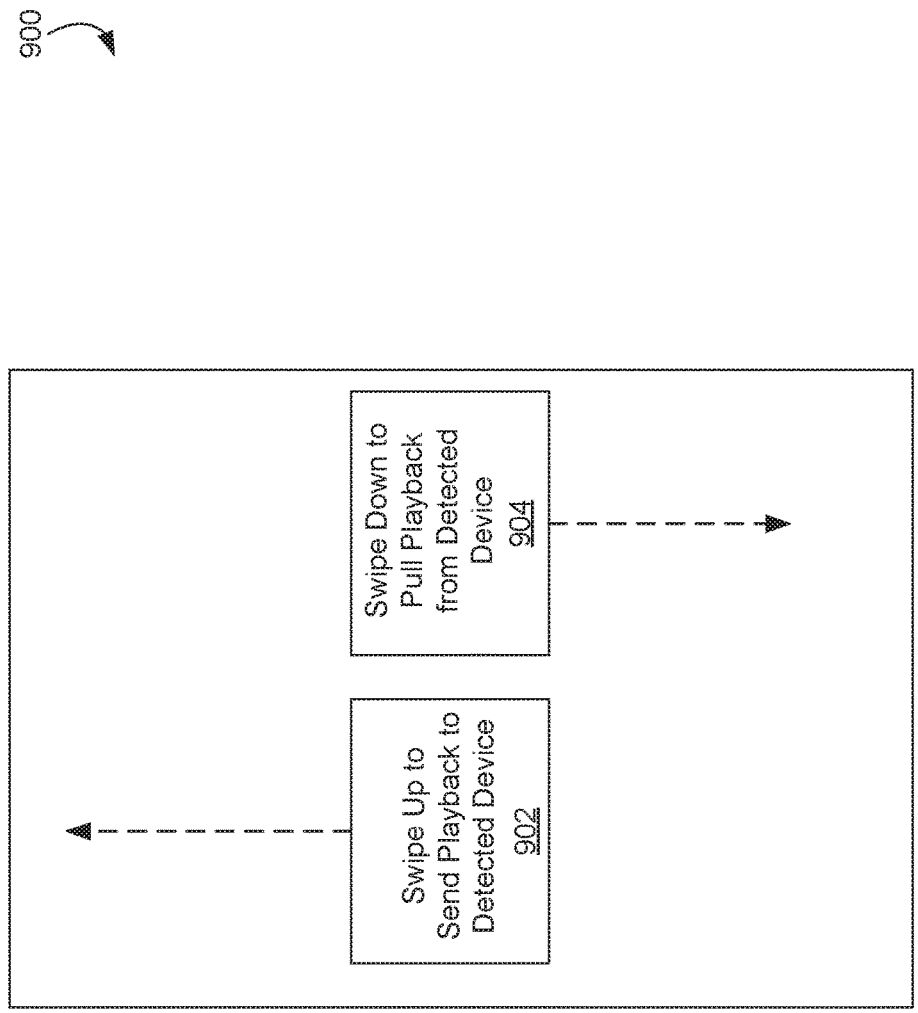
FIG. 9 illustrates an example graphical user interface for transferring playback of a playback queue from a user device to a playback device or transferring playback of a playback queue from a playback device to a user device.

FIG. 9 illustrates an example graphical user interface 900 for transferring playback of playback queue 106 from user device 102 to playback device 120 or transferring playback of playback queue 124 from playback device 106 to user device 102. For example, graphical user interface (GUI) 900 can be presented when user device 120 determines that media application 104 on user device 102 is playing a media item and media application 122 on playback device 120 is also playing a media item. In some implementations, GUI 900 can be presented on a lock screen of user device 102. Thus, a user may manipulate GUI 900 when user device is locked and without unlocking user device 102 (e.g., before entering the user's credentials to unlock user device 102).

In some implementations, GUI 900 can include graphical element 902. For example, graphical element 902 can include a prompt informing the user that manipulation of graphical element 902 will cause user device 102 to send playback of playback queue 106 to the detected proximate playback device (e.g., playback device 120). The user may provide input (e.g., touch input) to move or manipulate graphical element 902 on GUI 900. For example, the user may provide input in the form of a swipe gesture (e.g., touch and drag) in an upward motion (e.g., away from the user) on the display of user device 102 to initiate the transfer of playback from user device 102 to playback device 120.

In some implementations, GUI 900 can include graphical element 904. For example, graphical element 904 can include a prompt informing the user that manipulation of graphical element 904 will cause user device 102 to transfer playback of playback queue 124 on the detected proximate playback device (e.g., playback device 120) to user device 102. The user may provide input (e.g., touch input) to move or manipulate graphical element 904 on GUI 900. For example, the user may provide input in the form of a swipe gesture (e.g., touch and drag) in a downward motion (e.g., toward the user) on the display of user device 102 to initiate the transfer of playback from playback device 120 to user device 102.

Returning to FIG. 7, at step 712, user device 102 can receive user input for sending playback queue 106 to playback device 120. For example, media application 104 can receiving user input manipulating graphical element 902.

At step 714, user device 102 can stop playback of playback queue 106. For example, media application 104 can stop playback of the currently playing media item and record the location (e.g., time offset) in the media item where playback was stopped. The time offset can be stored in the corresponding media item data in playback queue 106. In some implementations, media application 104 can store an indication of which media item was playing when playback of playback queue 106 was stopped. For example, media application 104 can store the media item identifier for the stopped or interrupted media item in playback queue 106.

At step 316, user device 102 can send playback queue 106 to playback device 120. For example, media application 104 can send playback queue 106 to media application 122 on playback device 120. Playback queue 106 can include an ordered collection of media items. Each media item in the playback queue can include media item data, including a media item identifier (e.g., track identifier, movie identifier, television episode identifier, etc.), an account identifier that identifies the account of the user who enqueued the media item, and/or a delegate token (described further below). For the interrupted media item (e.g., the first media item in the queue), the media item data can include a time offset that indicates the current position of playback. When sending playback queue 106 at step 316, media application 104 can include an indication that media application 122 should take over playback of playback queue 106. When sending playback queue 106 at step 316, media application 104 can include an indication (e.g., a media item identifier) of which media item was stopped or interrupted when playback of playback queue 106 was stopped so that media application 122 can resume play back at the indicated media item. When media application 122 receives playback queue 106, media application 122 can save playback queue 106 as playback queue 124 and continue playback of playback queue 124 (e.g., playback queue 106) at the time offset indicated in the media item in playback queue 124 that media application 104 indicated should be resumed. Thus, a user can cause user device 102 to transfer playback of a playback queue currently being played by user device 102 to a nearby playback device.

Figure 8:
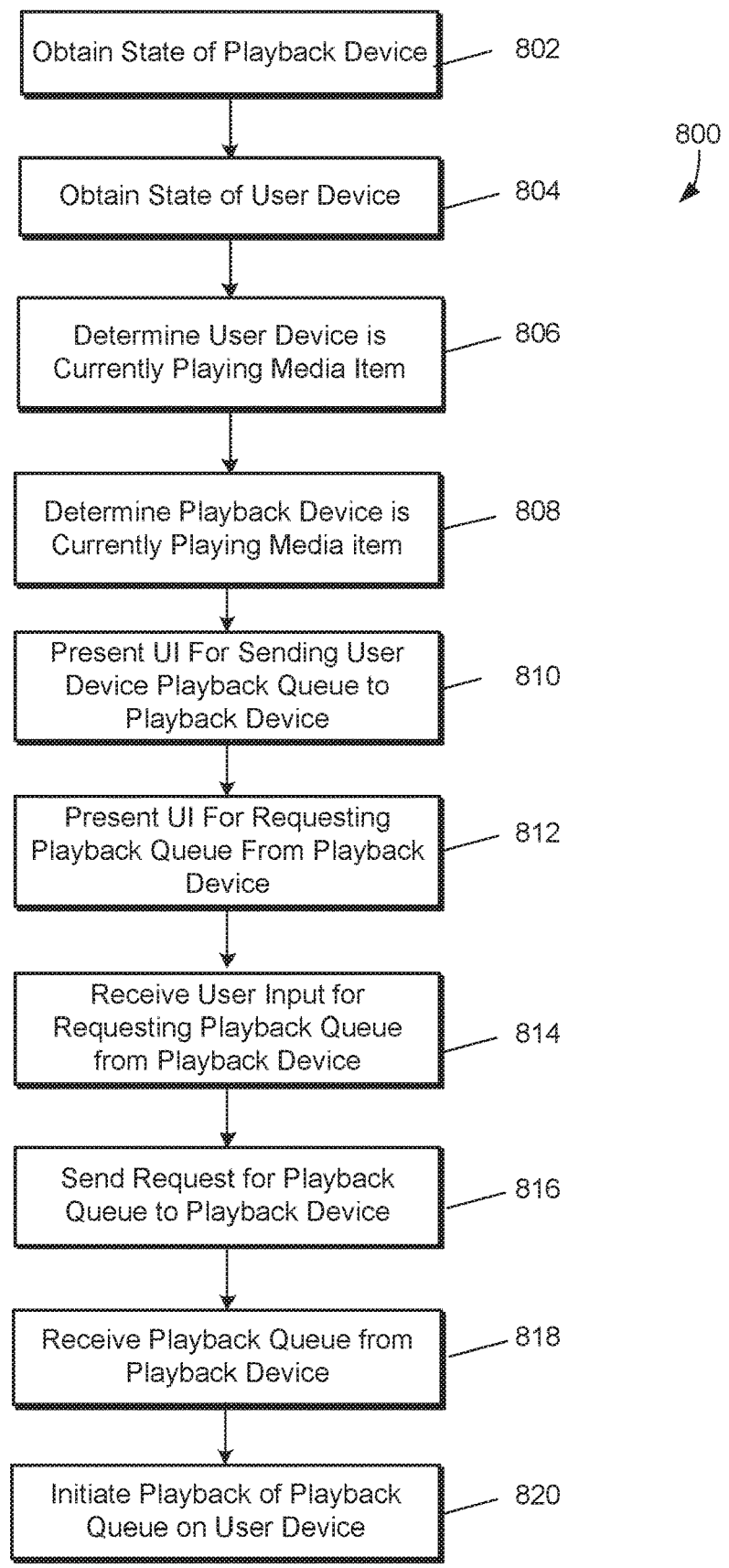
FIG. 8 is a flow diagram of an example process for retrieving a playback queue from a playback device when both a user device and a playback device are currently playing media items.

FIG. 8 is a flow diagram of an example process 800 for retrieving a playback queue from a playback device when both user device 102 and playback device 120 are currently playing media items. For example, process 800 can be performed by user device 102 after establishing a connection with playback device 120 according to process 200 described above.

At step 802, user device 102 can obtain the playback state of playback device 120. For example, media application 104 can send a message to media application 122 on playback device 120 requesting the playback state of media application 122. Media application 122 can send a response to media application 104 indicating that the playback state of media application 122 is that media application 122 is not playing any media items at the time of the request. Media application 122 can send a response to media application 104 indicating that the playback state of media application 122 is that media application 122 is currently playing a media item.

At step 804, user device 102 can obtain the playback state of user device 102. For example, media application 104 can obtain information indicating whether media application 104 is currently playing any media item.

At step 806, user device 102 can determine that user device 102 is not currently playing a media item. For example, media application 104 can determine that media application 104 is not currently playing a media item based on the state information obtained at step 804.

At step 808, user device 102 can determine that playback device 120 is currently playing a media item. For example, media application 104 can determine that media application 122 is currently playing a media item based on the state information obtained at step 802.

At step 810, user device 102 can present a graphical user interface for requesting the playback queue from playback device 120. For example, based on the determination that media application 104 on user device 102 is not currently playing a media item and that media application 122 on playback device 120 is currently playing a media item, user device 102 can present a graphical user interface (e.g., graphical user interface 900 of FIG. 9) that a user can manipulate to cause media application 104 to transfer playback of playback queue 124 from playback device 120 to user device 102. In this case, transferring playback queue 124 to playback device 102 will cause media application 104 on user device 102 take over playback of playback queue 124 from media application 122.

FIG. 9 illustrates an example graphical user interface 900 for transferring playback of playback queue 106 from user device 102 to playback device 120 or transferring playback of playback queue 124 from playback device 106 to user device 102. For example, graphical user interface (GUI) 900 can be presented when user device 120 determines that media application 104 on user device 102 is playing a media item and media application 122 on playback device 120 is also playing a media item. In some implementations, GUI 900 can be presented on a lock screen of user device 102. Thus, a user may manipulate GUI 900 when user device is locked and without unlocking user device 102 (e.g., before entering the user's credentials to unlock user device 102).

In some implementations, GUI 900 can include graphical element 902. For example, graphical element 902 can include a prompt informing the user that manipulation of graphical element 902 will cause user device 102 to send playback of playback queue 106 to the detected proximate playback device (e.g., playback device 120). The user may provide input (e.g., touch input) to move or manipulate graphical element 902 on GUI 00. For example, the user may provide input in the form of a swipe gesture (e.g., touch and drag) in an upward motion (e.g., away from the user) on the display of user device 102 to initiate the transfer of playback from user device 102 to playback device 120.

In some implementations, GUI 900 can include graphical element 904. For example, graphical element 904 can include a prompt informing the user that manipulation of graphical element 904 will cause user device 102 to transfer playback of playback queue 124 on the detected proximate playback device (e.g., playback device 120) to user device 102. The user may provide input (e.g., touch input) to move or manipulate graphical element 904 on GUI 900. For example, the user may provide input in the form of a swipe gesture (e.g., touch and drag) in an downward motion (e.g., toward from the user) on the display of user device 102 to initiate the transfer of playback from playback device 120 to user device 102.

Returning to FIG. 8, at step 812, user device 102 can receive user input for transferring playback of playback queue 124 to user device 102. For example, media application 104 can receive user input manipulating graphical element 904, described above.

At step 914, user device 102 can send a request to take over playback of playback queue 124 to playback device 120. For example, in response to receiving the user input at step 912, media application 104 can send a message to media application 122 on playback device 120 requesting that playback of playback queue 124 be transferred to media application 104 on user device 102. In response to receiving the request, media application 122 on playback device 120 can stop playback of the currently playing media item in playback queue 124 and record the location (e.g., time offset) where playback was stopped in the media item. The time offset can be stored in the corresponding media item data (e.g., in the first media item) in playback queue 124. In some implementations, media application 122 can store an indication of which media item was playing when playback of playback queue 124 was stopped. For example, media application 122 can store the media item identifier for the stopped or interrupted media item in playback queue 124.

At step 916, user device 102 can receive playback queue 124 from playback device 120. For example, media application 122 can send playback queue 124 to media application 104 on user device 102. Playback queue 124 can include an ordered collection of media items. Each media item in the playback queue can include media item data, including a media item identifier (e.g., track identifier, movie identifier, television episode identifier, etc.), an account identifier that identifies the account of the user who enqueued the media item, and/or a delegate token (described further below). For the interrupted media item (e.g., the first media item in the queue), the media item data can include a time offset that indicates the current position of playback. When sending playback queue 124 at step 916, media application 122 can include an indication that media application 104 should take over playback of playback queue 124. When sending playback queue 124 at step 916, media application 122 can include an indication (e.g., the identifier for the interrupted media item) of which media item in playback queue 124 should be played first so that media application 122 can resume play back at the indicated media item. When media application 104 receives playback queue 124, media application 104 can save playback queue 124 as playback queue 106.

At step 918, user device 102 can initiate playback of playback queue 106 on user device 102. For example, media application 104 can continue playback of playback queue 106 (e.g., playback queue 124) at the time offset indicated in the media item in playback queue 106 that media application 122 indicated should be resumed. Thus, a user can cause user device 102 to transfer playback of a playback queue currently being played by a nearby playback device to user device 102.

Figure 10:
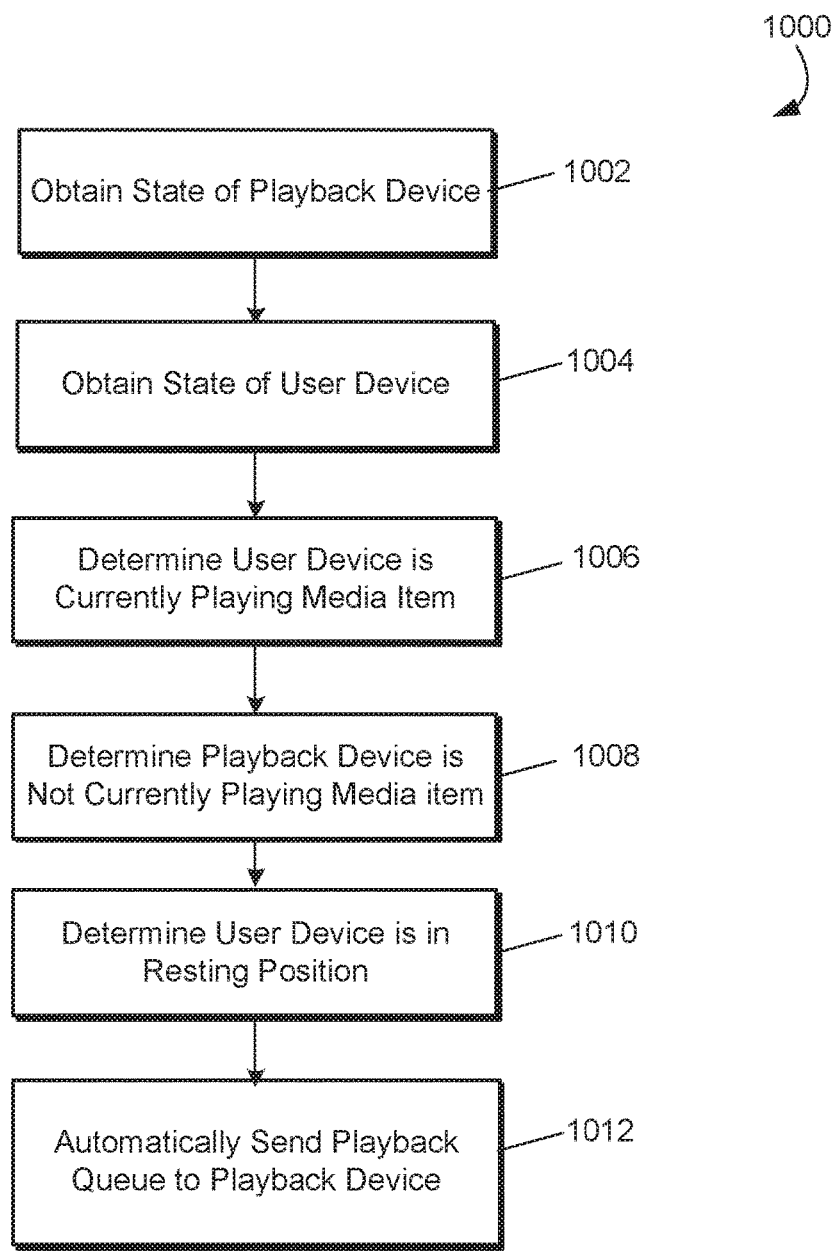
FIG. 10 is a flow diagram of an example process for automatically transferring playback of a playback queue from a user device to a playback device.

FIG. 10 is a flow diagram of an example process 1000 for automatically transferring playback of a playback queue from a user device to a playback device. For example, process 1000 can be performed by user device 102 to automatically transfer playback of a playback queue to a playback device when user device 102 is playing media items from a playback queue and user device 102 detects that user device 102 has been placed in a resting position near the playback device.

At step 1002, user device 102 can obtain the playback state of playback device 120. For example, media application 104 can send a message to media application 122 on playback device 120 requesting the playback state of media application 122. Media application 122 can send a response to media application 104 indicating that the playback state of media application 122 is that media application 122 is not playing any media items at the time of the request. Media application 122 can send a response to media application 104 indicating that the playback state of media application 122 is that media application 122 is currently playing a media item.

At step 1004, user device 102 can obtain the playback state of user device 102. For example, media application 104 can obtain information indicating whether media application 104 is currently playing any media item.

At step 1006, user device 102 can determine that user device 102 is currently playing a media item. For example, media application 104 can determine that media application 104 is currently playing a media item based on the state information obtained at step 304.

At step 1008, user device 102 can determine that playback device 120 is not currently playing a media item. For example, media application 104 can determine that media application 122 is not currently playing a media item based on the state information obtained at step 302.

At step 1010, user device 102 can determine that user device 102 is in a resting position. For example, user device 102 can include motion sensors to detect the position, orientation, and/or movement of user device 102. When a user places user device 102 in a resting position (e.g., motionless, on a table, horizontally oriented, etc.), user device 102 can receive motion data from the motion sensors and determine that user device 102 has been placed in the resting position.

At step 1012, user device 102 can automatically send playback queue 106 to playback device 120. For example, in response to determining that user device 102 is proximate to playback device 102, that user device 102 is currently playing a playback queue and playback device 102 is not, and/or that user device 102 is in a resting position, media application 104 on user device 102 can automatically transfer playback of playback queue 106 to media application 122 on playback device 120. For example, media application 104 can stop playback of the currently playing media item and record the location (e.g., time offset) in the media item where playback was stopped. The time offset can be stored in the corresponding media item data in playback queue 106. In some implementations, media application 104 can store an indication of which media item was playing when playback of playback queue 106 was stopped. For example, media application 104 can store the media item identifier for the stopped or interrupted media item in playback queue 106.

After stopping playback of playback queue 106, media application 104 can send playback queue 106 to media application 122 on playback device 120. Playback queue 106 can include an ordered collection of media items. Each media item in the playback queue can include media item data, including a media item identifier (e.g., track identifier, movie identifier, television episode identifier, etc.), an account identifier that identifies the account of the user who enqueued the media item, and/or a delegate token (described further below). For the interrupted media item (e.g., the first media item in the queue), the media item data can include a time offset that indicates the current position of playback. When sending playback queue 106 at step 1012, media application 104 can include an indication that media application 122 should take over playback of playback queue 106. When sending playback queue 106 at step 1012, media application 104 can include an indication (e.g., a media item identifier) of which media item was stopped or interrupted when playback of playback queue 106 was stopped so that media application 122 can resume play back at the indicated media item. When media application 122 receives playback queue 106, media application 122 can save playback queue 106 as playback queue 124 and continue playback of playback queue 124 (e.g., playback queue 106) at the time offset indicated in the media item in playback queue 124 that media application 104 indicated should be resumed. Thus, user device 102 can automatically transfer playback of a playback queue currently being played by user device 102 to a nearby playback device.

The playback queue transfer processes described above describe a process that stops play back at a playback sending device (e.g., user device 102 or playback device 120), transfers the playback queue, and starts play back at a playback receiving device (e.g., playback device 120 or user device 102) at a location in a media item where playback was stopped. In some implementations, transferring playback (e.g., a playback queue) between a playback sending device and a playback receiving device can be performed without interrupting playback. For example, the playback queue on the sending device can be send to the receiving device while the sending device continues to play media items in the playback queue. The receiving device can synchronize playback of media items in the playback queue on the receiving device such that both receiving device and sending device are playing the same media item in the playback queue in harmony. After playback has begun on the receiving device, the sending device can fade out (e.g., reduce the volume) of the playing media item on the sending device and finally stop playback on the sending device. Thus, the transfer of playback of the playback queue can be performed without interrupting the playback of the media items in the playback queue.

In some implementations, playback of a playback queue can be moved between playback devices. For example, multiple playback devices 120 can be configured to play media items together. A primary playback device 120 can manage playback queue 124 and send audio and/or video data to secondary playback devices 120. To provide failover should the primary playback device 120 fail (e.g., lose power, lose network connection, shutdown, etc.), the primary playback device 120 and secondary playback devices 120 can synchronize playback queues. When a secondary playback device 120 determines that the primary playback device 120 is no longer reachable, the secondary playback device 120 can take over as the primary playback device 120 can take over management of the playback queue, including coordinating play back among the remaining secondary playback devices 120.

Figure 11:
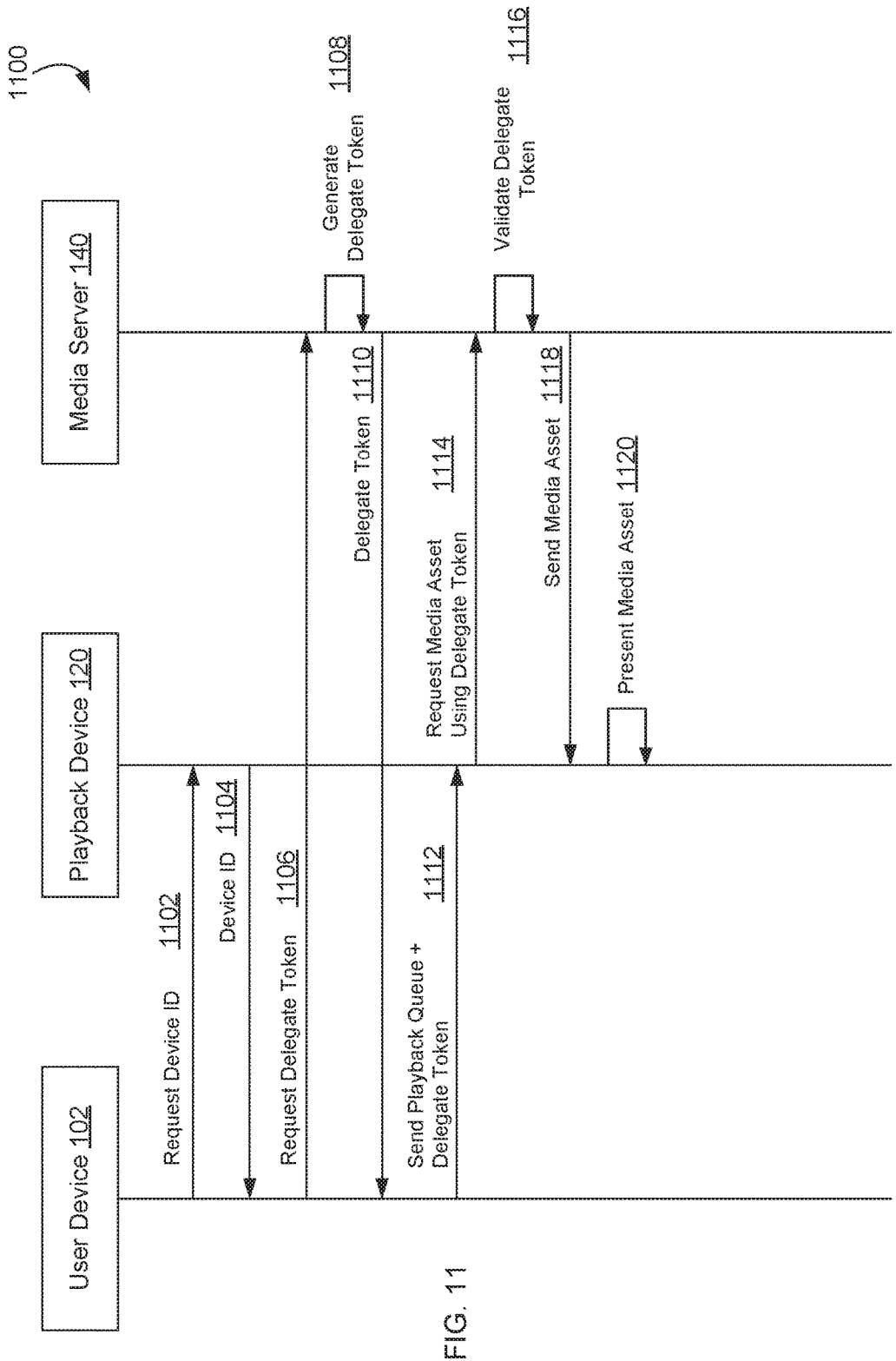
FIG. 11 is a device interaction diagram illustrating an example process for delegating credentials from a first user's device to a second user's device.

FIG. 11 is a device interaction diagram illustrating an example process 1100 for delegating credentials from a first user's device to a second user's device. For example, typically user device 102 and playback device 120 will be owned by the same user and configured with the same user account credentials for accessing media service 142 and obtaining media items from media service 142. However, in some instances, user device 102 may be owned by a different user than playback device 120 and/or configured with different user account credentials than user device 102. If user device 102 sends a playback queue to playback device 120 that includes a media item that the user of playback back device 120 does not have access to, playback device 120 may not be able to play the media item. Process 1100 provides for delegating the user credentials of user device 102 to playback device 120 so that playback device 120 can play media items that playback device 120 may not have access to otherwise.

In some implementations, process 1100 can be performed after user device 102 establishes a connection to playback device 120, as described above with reference to process 200 of FIG. 2. In some implementations, process 110 can be performed after user device 102 connects to playback device 120 through other means (e.g., Bluetooth pairing, other Wi-Fi discovery mechanisms, etc.). For example, when user device 102 connects to the same local network as playback device 120, user device 102 can be notified of the availability of playback device 120. Media application 104 can present an graphical user interface that allows the user of user device 102 to connect to playback device 120 through the local network. The user can provide input selecting the playback device 120 and user device 102 can connect to playback device 120 through the local network.

In some implementations, playback device 120 can be configured to provide access control to playback device 120. For example, a user can configure playback device 120 so that other users can only connect to playback device 120 under certain conditions. For example, playback device 120 can be configured with a password. When user device 102 provides the password to playback device 120 (e.g., after the user inputs the password), then playback device 120 can allow user device 120 to connect to playback device 120 and modify playback queue 124. If user device 102 has access to a network managed home environment and playback device 120 is part of the home environment, then playback device 120 can allow user device 102 to connect to playback device 120 and modify playback queue 124. Playback device 120 can be configured to allow user device to access playback device 120 when user device 102 is in the same location (e.g., same home, geofence, etc.) as playback device 120, or connected to the same local network as playback device 120. In some implementations, playback device 120 can be configured to allow any device to access playback device 120. In some implementations, playback device 120 can require user device 120 to provide a password in addition to or instead of any of the criteria described above.

At operation 1102, user device 102 can request a device identifier from playback device 120. For example, media application 104 can request the device identifier from playback device 120 (e.g., media application 122) so that user device 102 can later obtain a delegate token for playback device 120.

At operation 1104, playback device 120 can send the device identifier for playback device 120 to user device 102. For example, the device identifier can be an identifier for playback device 120 that has been registered with or used to access media service 142 on media server 140. The device identifier can be an identifier assigned to playback device 120 by the user/owner of playback device 120. The device identifier can be a hardware identifier associated with playback device 120 assigned at the factory where playback device 120 was made. The device identifier can be a media access control (MAC) address or a virtual identifier assigned to playback device 120.

At operation 1106, user device 102 can request a delegate token for playback device 120. For example, in response to receiving the device identifier for playback device 120 at operation 1104, media application 104 can send a message to media service 142 on media server 140 requesting a delegate token for playback device 120. For example, the message (e.g., the delegate token request) can include the device identifier for playback device 120 and/or the media service account credentials (e.g., user name, password, etc.) of the user of user device 102. If music application 104 has already logged in and/or established a connection to media service 142, music application 104 can send the device identifier in the delegate token request without the user's media account credentials.

At operation 1108, media server 140 can generate a delegate token associated with the device identifier of playback device 120. For example, the delegate token can be randomly generated data. Media service 142 can store the delegate token in the media service account of the user of user device 102 and in association with (e.g., mapped to) the device identifier of playback device. Alternatively, the delegate token can be generated based on or derived from the device identifier and/or the media service account identifier of the user of user device 102. For example, media service 142 can sign token data, including the device identifier, media service account identifier, and some random anti-replay data, with a private key corresponding to media service 142. 120.

At operation 1110, media server 140 can send the delegate token to user device 102. For example, media service 142 can send the delegate token stored in association with the device identifier of playback device 120 to user device 102.

At operation 1112, user device 102 can send a playback queue, including the delegate token for playback device 120, to playback device 120. For example, the playback queue (e.g., playback queue 106) can include one or more media items to be added to the playback queue (e.g., playback queue 124) of media application 122 on playback device 120. As described above, each media item in playback queue 106 can include a media item identifier (e.g., a URL for obtaining the media item asset), an account identifier for the media service account configured on user device 102 (e.g., the account enqueuing the media item), and the delegate token associated with the account identifier and the device identifier of playback device 120 (e.g., generated at operation 1108).

At operation 1114, playback device 120 can request a media asset from media server 140 using the delegate token. For example, when media application 122 on playback device 120 selects a media item in playback queue 124 for play back and determines that the account identifier for the media item in the queue does not correspond to the media service account identifier configured for playback device 120, playback device can send a message requesting access to the media item through the media service account associated with the media item in the playback queue. For example, the message can include the device identifier for playback device 120, the media item identifier for the selected media item, media service account identifier for the selected media item, and delegate token for the selected media item.

At operation 1116, media server 140 can validate the delegate token. For example, media service 142 can receive the device identifier for playback device 120, the media item identifier, media service account identifier, and delegate token for the selected media item in the message sent at operation 1114. Media service 140 can obtain the account information associated with the media service account identifier. The account information can include a mapping of playback device identifiers to delegate tokens stored at media service 142. Media service 140 can use the device identifier for playback device 120 to obtain the corresponding stored delegate token for playback device 120. Media service 140 can compare the obtained stored delegate token for playback device 120 to the delegate token receive from playback device 120 in the message of operation 1114. If the tokens match (e.g., the tokens are the same), then media service 142 can determine that the received delegate token is valid.

Alternatively, when the delegate token includes the signed token data (e.g., device identifier, account identifier, and/or anti-replay data), as described above, media service 142 can attempt to verify the signature on the received delegate token to determine whether the token was generated by media service 142. If the token was not signed using the private key of media service 142, then media service 142 can determine that the delegate token is not valid. If the token was signed by media service 142, then media service 142 can determine whether the playback device that sent the delegate token corresponds to the device identifier included in the token data. If media service 142 can verify the signature on the delegate token and can confirm that the device identifier corresponds to the playback device, then media service 142 can determine that the delegate token is valid.

At operation 1118, media server 140 can send the requested media asset and/or media keys to playback device 120. For example, media service 142 can send (e.g., stream) the audio and/or video data (e.g., the media asset) corresponding requested media item to media application 122 on playback device 120. In this case, the media asset is provided through the media service account of the user of user device 102 even though playback device 120 (e.g., the receiving device) is associated with a different media service account corresponding to a different user.

At operation 1120, playback device 120 can present the media asset sent by media server 140. For example, media application 122 on playback device 120 can present the audio and/or video data corresponding to the media item requested at operation 1114.

While the implementations described with reference to process 1100 above use a device identifier to tie the delegate token to a specific playback device, process 1100 can be performed without tying the delegate token to a specific device identifier. Thus, step 1102 may be optional and the following steps can be performed to generate a delegate token without obtaining or using the device identifier for the playback device. For example, media service 142 can generate a delegate token without using the playback device identifier and validate the delegate token without verifying the playback device identifier in the delegate token.

In some implementations, delegate tokens can be archived with playback queues and/or media items. For example, a user may wish to re-play a playback queue at a later time but may not be able to play a particular media item in the playback queue without a delegate token. Playback device 120 can archive the playback queue and delegate tokens so that the media item in the playback queue can be played back later using the delegate token.

To enable the reader to obtain a clear understanding of the technological concepts described herein, the above processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes above may omit or briefly summarize some of the details of the technologies disclosed herein for clarity, the details described in the paragraphs above may be combined with the process steps described above to get a more complete and comprehensive understanding of these processes and the technologies disclosed herein.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 12:
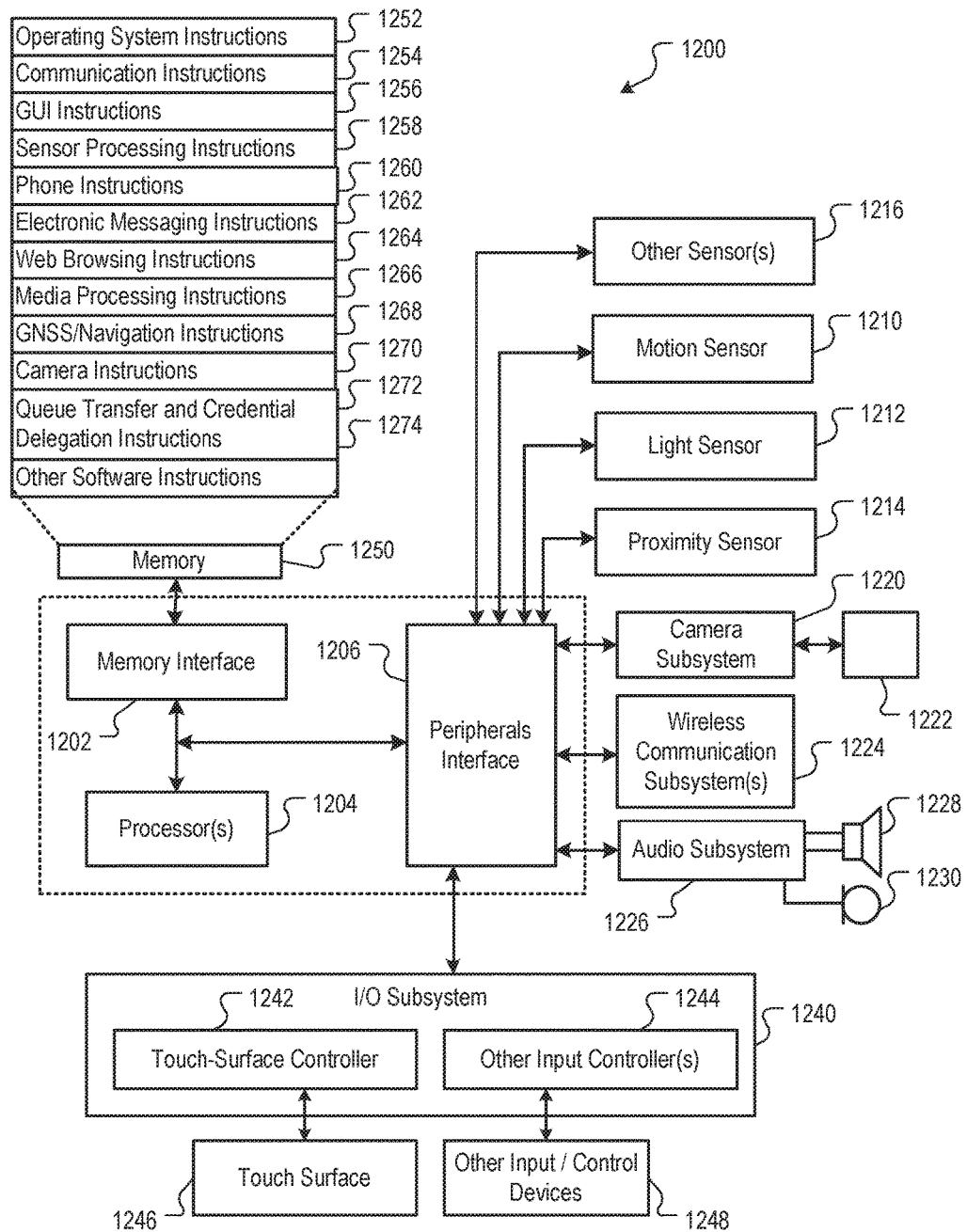
FIG. 12 is a block diagram of an example computing device that can implement the features and processes of FIGS. 1-11.

FIG. 12 is a block diagram of an example computing device 1200 that can implement the features and processes of FIGS. 1-11. The computing device 1200 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the computing device 1200 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate orientation, lighting, and proximity functions. Other sensors 1216 can also be connected to the peripherals interface 1206, such as a global navigation satellite system (GNSS) (e.g., GPS receiver), a temperature sensor, a biometric sensor, magnetometer or other sensing device, to facilitate related functionalities.

A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips. The camera subsystem 1220 and the optical sensor 1222 can be used to collect images of a user to be used during authentication of a user, e.g., by performing facial recognition analysis.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network(s) over which the computing device 1200 is intended to operate. For example, the computing device 1200 can include communication subsystems 1224 designed to operate over a GSM network, a GPRS network, an EDGE network, a Wi-Fi or WiMax network, and a Bluetooth™ network. In particular, the wireless communication subsystems 1224 can include hosting protocols such that the device 100 can be configured as a base station for other wireless devices.

An audio subsystem 1226 can be coupled to a speaker 1228 and a microphone 1230 to facilitate voice-enabled functions, such as speaker recognition, voice replication, digital recording, and telephony functions. The audio subsystem 1226 can be configured to facilitate processing voice commands, voiceprinting and voice authentication, for example.

The I/O subsystem 1240 can include a touch-surface controller 1242 and/or other input controller(s) 1244. The touch-surface controller 1242 can be coupled to a touch surface 1246. The touch surface 1246 and touch-surface controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration can disengage a lock of the touch surface 1246; and a pressing of the button for a second duration that is longer than the first duration can turn power to the computing device 1200 on or off. Pressing the button for a third duration can activate a voice control, or voice command, module that enables the user to speak commands into the microphone 1230 to cause the device to execute the spoken command. The user can customize a functionality of one or more of the buttons. The touch surface 1246 can, for example, also be used to implement virtual or soft buttons and/or a keyboard.

In some implementations, the computing device 1200 can present recorded audio and/or video files, such as MP3, AAC, and MPEG files. In some implementations, the computing device 1200 can include the functionality of an MP3 player, such as an iPod™. The computing device 1200 can, therefore, include a 36-pin connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks.

The operating system 1252 can include instructions for handling basic system services and for performing hardware dependent tasks. In some implementations, the operating system 1252 can be a kernel (e.g., UNIX kernel). In some implementations, the operating system 1252 can include instructions for performing voice authentication. For example, operating system 1252 can implement the playback queue transfer and credential delegation features as described with reference to FIGS. 1-11.

The memory 1250 can also store communication instructions 1254 to facilitate communicating with one or more additional devices, one or more computers and/or one or more servers. The memory 1250 can include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Navigation instructions 1268 to facilitate GNSS and navigation-related processes and instructions; and/or camera instructions 1270 to facilitate camera-related processes and functions.

The memory 1250 can store other software instructions 1272 to facilitate other processes and functions, such as the playback queue transfer and credential delegation processes and functions as described with reference to FIGS. 1-11.

The memory 1250 can also store other software instructions 1274, such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the computing device 1200 can be implemented in hardware and/or in software, including in one or more signal processing and/or application specific integrated circuits.

What is claimed is:

1. A method comprising:
    determining, by a computing device, that the computing device is within a threshold distance of a playback device;
    in response to determining that the computing device is within the threshold distance of the playback device:
        determining, by the computing device, a first media playback state of the playback device; and
        determining, by the computing device, a second media playback state of the computing device;
    determining, by the computing device, a graphical user interface to present based on the first media playback state and the second media playback state, the graphical user interface being determined from a group of graphical user interfaces operable to initiate a transfer of a playback queue between the playback device and the computing device, wherein the group of graphical user interfaces comprises:
        1) a first graphical user interface configured to initiate a transfer of a first playback queue from the computing device to the playback device,
        2) a second graphical user interface configured to initiate a transfer of a second playback queue from the playback device to the computing device, and
        3) a third graphical user interface configured to initiate a transfer of one or more of the first and second playback queues between the playback device and the computing device;
    presenting, by the computing device, the determined graphical user interface;
    receiving, by the computing device, user input to the determined graphical user interface indicating that the user wishes to transfer playback of a selected playback queue between the computing device and the playback device; and
    in response to receiving the user input, transferring, by the computing device, playback of the selected playback queue between the computing device and the playback device.

2. The method of claim 1, wherein the first media playback state is that the playback device is not currently playing a media item, wherein the second media playback state is that the computing device is currently playing a media item, and wherein the determined graphical user interface is the first graphical user interface configured to initiate the transfer of the first playback queue from the computing device to the playback device.

3. The method of claim 1, wherein the first media playback state is that the playback device is currently playing a media item, wherein the second media playback state is that the computing device is not currently playing a media item, and wherein the determined graphical user interface is the second graphical user interface configured to initiate the transfer of the second playback queue from the playback device to the computing device.

4. The method of claim 1, wherein the first media playback state is that the playback device is currently playing a media item, wherein the second media playback state is that the computing device is currently playing a media item, and wherein the determined graphical user interface is the third graphical user interface configured to initiate the transfer of one or more of the first and second playback queues between the playback device and the computing device.

5. The method of claim 2, further comprising:
    in response to receiving the user input, transferring, by the computing device, playback of the first playback queue from the computing device to the playback device.

6. The method of claim 3, further comprising:
    in response to receiving the user input, transferring, by the computing device, playback of the second playback queue from the playback device to the computing device.

7. The method of claim 1, further comprising:
    in response to receiving the user input, obtaining, by the computing device, the second playback queue from the playback device;
    determining a media item in the second playback queue to playback on the computing device;
    determining a time offset for continuing playback of the media item; and
    playing the media item starting at the time offset on the computing device.

8. A non-transitory computer readable medium including one or more sequences of instructions that, when executed by one or more processors, cause the one or more processors to perform operations comprising:
    determining, by a computing device, that the computing device is within a threshold distance of a playback device;
    in response to determining that the computing device is within the threshold distance of the playback device:
        determining, by the computing device, a first media playback state of the playback device; and
        determining, by the computing device, a second media playback state of the computing device;
    determining, by the computing device, a graphical user interface to present based on the first media playback state and the second media playback state, the graphical user interface being determined from a group of graphical user interfaces operable to initiate a transfer of a playback queue between the playback device and the computing device, wherein the group of graphical user interfaces comprises:
1) a first graphical user interface configured to initiate a transfer of a first playback queue from the computing device to the playback device,
2) a second graphical user interface configured to initiate a transfer of a second playback queue from the playback device to the computing device, and
3) a third graphical user interface configured to initiate a transfer of one or more of the first and second playback queues between the playback device and the computing device;

presenting, by the computing device, the determined graphical user interface;

receiving, by the computing device, user input to the determined graphical user interface indicating that the user wishes to transfer playback of a selected playback queue between the computing device and the playback device; and in response to receiving the user input, transferring, by the computing device, playback of the selected playback queue between the computing device and the playback device.

9. The non-transitory computer readable medium of claim 8, wherein the first media playback state is that the playback device is not currently playing a media item, wherein the second media playback state is that the computing device is currently playing a media item, and wherein the determined graphical user interface is the first graphical user interface configured to initiate the transfer of the first playback queue from the computing device to the playback device.

10. The non-transitory computer readable medium of claim 8, wherein the first media playback state is that the playback device is currently playing a media item, wherein the second media playback state is that the computing device is not currently playing a media item, and wherein the determined graphical user interface is the second graphical user interface configured to initiate the transfer of the second playback queue from the playback device to the computing device.

11. The non-transitory computer readable medium of claim 8, wherein the first media playback state is that the playback device is currently playing a media item, wherein the second media playback state is that the computing device is currently playing a media item, and wherein the determined graphical user interface is the third graphical user interface configured to initiate the transfer of one or more of the first and second playback queues between the playback device and the computing device.

12. The non-transitory computer readable medium of claim 9, wherein the instructions cause to processors to perform operations comprising:
in response to receiving the user input, transferring, by the computing device, playback of the first playback queue from the computing device to the playback device.

13. The non-transitory computer readable medium of claim 10, wherein the instructions cause to processors to perform operations comprising:
in response to receiving the user input, transferring, by the computing device, playback of the second playback queue from the playback device to the computing device.

14. The non-transitory computer readable medium of claim 8, wherein the instructions cause to processors to perform operations comprising:

in response to receiving the user input, obtaining, by the computing device, the second playback queue from the playback device;
determining a media item in the second playback queue to playback on the computing device;
determining a time offset for continuing playback of the media item; and
playing the media item starting at the time offset on the computing device.

15. A system comprising:
one or more processors; and
a non-transitory computer readable medium including one or more sequences of instructions that, when executed by the one or more processors, cause the one or more processors to perform operations comprising:
determining, by a computing device, that the computing device is within a threshold distance of a playback device;
in response to determining that the computing device is within the threshold distance of the playback device:
determining, by the computing device, a first media playback state of the playback device; and
determining, by the computing device, a second media playback state of the computing device;
determining, by the computing device, a graphical user interface to present based on the first media playback state and the second media playback state, the graphical user interface being determined from a group of graphical user interfaces operable to initiate a transfer of a playback queue between the playback device and the computing device, wherein the group of graphical user interfaces comprises:
1) a first graphical user interface configured to initiate a transfer of a first playback queue from the computing device to the playback device,
2) a second graphical user interface configured to initiate a transfer of a second playback queue from the playback device to the computing device, and
3) a third graphical user interface configured to initiate a transfer of one or more of the first and second playback queues between the playback device and the computing device;
presenting, by the computing device, the determined graphical user interface;
receiving, by the computing device, user input to the determined graphical user interface indicating that the user wishes to transfer playback of a selected playback queue between the computing device and the playback device; and
in response to receiving the user input, transferring, by the computing device, playback of the selected playback queue between the computing device and the playback device.

16. The system of claim 15, wherein the first media playback state is that the playback device is not currently playing a media item, wherein the second media playback state is that the computing device is currently playing a media item, and wherein the determined graphical user interface is the first graphical user interface configured to initiate the transfer of the first playback queue from the computing device to the playback device.

17. The system of claim 15, wherein the first media playback state is that the playback device is currently playing a media item, wherein the second media playback state is that the computing device is not currently playing a media item, and wherein the determined graphical user interface is the second graphical user interface configured to initiate the transfer of the second playback queue from the playback device to the computing device.

18. The system of claim 15, wherein the first media playback state is that the playback device is currently playing a media item, wherein the second media playback state is that the computing device is currently playing a media item, and wherein the determined graphical user interface is the third graphical user interface configured to initiate the transfer of one or more of the first and second playback queues between the playback device and the computing device.

19. The system of claim 16, wherein the instructions cause to processors to perform operations comprising:

in response to receiving the user input, transferring, by the computing device, playback of the first playback queue from the computing device to the playback device.

20. The system of claim 17, wherein the instructions cause to processors to perform operations comprising:

in response to receiving the user input, transferring, by the computing device, playback of the second playback queue from the playback device to the computing device.

21. The system of claim 15, wherein the instructions cause to processors to perform operations comprising:

in response to receiving the user input, obtaining, by the computing device, the second playback queue from the playback device;

determining a media item in the second playback queue to playback on the computing device;

determining a time offset for continuing playback of the media item; and playing the media item starting at the time offset on the computing device.

* * * * *